United States Patent Office.

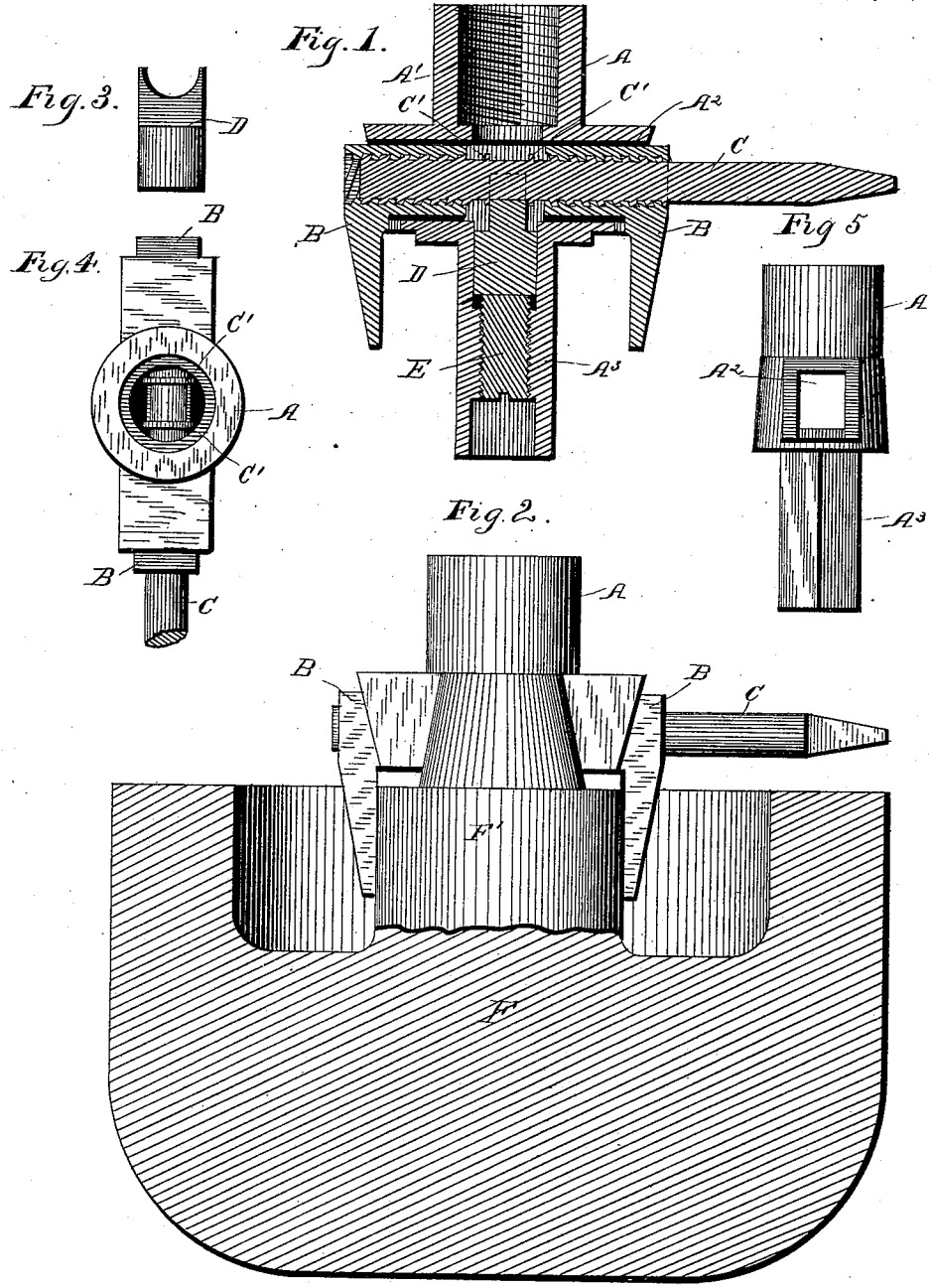

CHARLES S. PECK, OF DANBURY, CONNECTICUT, ASSIGNOR OF ONE-HALF TO JOHN H. FANTON, OF SAME PLACE.

CHUCK FOR HAT-BLOCKS.

SPECIFICATION forming part of Letters Patent No. 306,856, dated October 21, 1884.

Application filed March 1, 1884. (No model.)

*To all whom it may concern:*

Be it known that I, CHARLES S. PECK, a citizen of the United States, residing at Danbury, in the county of Fairfield and State of Connecticut, have invented certain new and useful Improvements in Chucks for Hat-Blocks; and I do hereby declare the following to be a full, clear, and exact description of the invention, such as will enable others skilled in the art to which it appertains to make and use the same.

My invention has for its object to simplify and improve this class of devices. With this end in view I have devised a novel construction of chuck which is quick-acting, takes firm hold on the block, is easy to manage, and cannot get out of repair.

My invention consists in the construction and combination of elements, as will be hereinafter fully described, and then pointed out in the claims.

In order that others may understand and use my improved device, I will proceed to describe the same, referring by letters to the accompanying drawings, forming part of this specification, in which—

Figure 1 is a central section. Fig. 2 is a side elevation showing the chuck as it appears in use, the block being shown partly in section. Fig. 3 shows the key in elevation. Fig. 4 is a top plan view, and Fig. 5 is an end elevation with the jaws removed.

Similar letters indicate like parts in all the figures.

A is the body of the chuck, which is cast in a single piece, and is screw-threaded, as at A', for engagement with the mandrel.

B B are the jaws, provided, respectively, with right and left internal screw-threads.

C is the operating shaft or rod, which is provided with right and left screw-threads, which engage with the corresponding internal threads upon the jaws. The jaws are made angular in cross-section, and slide in correspondingly-shaped ways $A^2$, which are cast with the body of the chuck. The inner ends of the screw-threads upon the operating-shaft do not come together, and between them I provide two circumferential ridges or splines, C'. Between these splines the shaft is engaged by a key or block, D, (see Fig. 3,) which partially encircles it, as indicated by dotted lines in Fig. 1. This key is held against the shaft by a set-screw, E, which is operated from the lower end of the shank $A^3$. (See Fig. 1.) If preferred, any equivalent means for holding the shaft against endwise movement may be adopted. This shank is made angular in cross-section, and in use engages in a correspondingly-shaped recess in the hub F' of block F.

The operation is as follows: The jaws, operating-shaft, and key being in proper position, set-screw E is tightened up to hold the shaft in operative position. As the key fits closely between the splines on the shaft, lateral movement of the shaft is rendered impossible. The jaws, being angular in cross-section and sliding in correspondingly-shaped ways, can have no rotary motion. It follows, therefore, that rotation of the operating-shaft must impart uniform motion to the jaws either toward or from each other. Having assembled the parts, the chuck is ready for use. As stated above, it is attached to the mandrel by screw-threads A', or in any suitable manner. To attach the block, the jaws are opened far enough to permit the hub of the block to pass between them, the shank of the chuck entering a corresponding angular recess in the hub, said recess not being shown in the drawings. The operating-shaft is then rotated in the opposite direction, which closes the jaws rapidly against the hub of the block, holding it firmly against any possible strain that can be brought to bear upon it. One end of shaft C extends out over the block, and is squared for convenience in operating by a key or any similar device.

It should be observed that in use the only movable parts are the jaws, their action being positive and in a direct line.

I do not desire to limit myself to the exact construction shown, as it will be obvious that the details of construction may be varied within reasonable limits without departing from the spirit of my invention, the gist of which consists in causing a pair of direct-acting jaws to grip the exterior of the hub of the block.

Having thus described my invention, I claim—

1. In a chuck for hat-blocks, a pair of jaws having respectively right and left screw-threads, and actuated toward or from each other by a correspondingly-threaded operating-shaft.

2. The jaws having respectively right and left screw-threads, and the operating-shaft, in combination with means for holding the shaft against lateral movement, and means for holding the chuck and block against independent rotation, substantially as described.

3. The operating-shaft having splines $C'$ and right and left screw-threads, in combination with angular jaws sliding in correspondingly-shaped ways, key D, and a set-screw.

4. The angular shank carrying the key and set-screw, and engaging the hub, in combination with a pair of direct-acting jaws which grip the exterior of the hub and are operated by right and left screw-threads.

In testimony whereof I affix my signature in presence of two witnesses.

CHAS. S. PECK.

Witnesses:
G. O. HOLMES,
J. H. FANTON.